Patented Oct. 24, 1922.                                              1,433,338

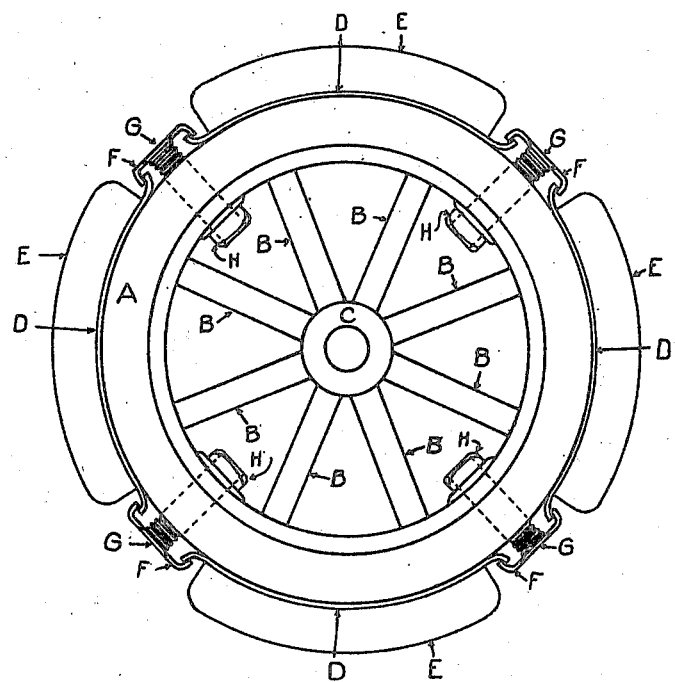

UNITED STATES PATENT OFFICE.

FREDERICK H. BOMMARIUS AND PHILIP CAROLLO, OF NEW ORLEANS, LOUISIANA.

SECTIONAL VEHICLE TIRE.

Application filed October 26, 1920. Serial No. 419,722.

*To all whom it may concern:*

Be it known that we, FREDERICK H. BOMMARIUS and PHILIP CAROLLO, citizens of the United States of America, residing at New Orleans, in the parish of Orleans and State of Louisiana, have invented certain new and useful Improvements in Sectional Vehicle Tires, of which the following is a specification.

This invention relates to sectional vehicle tires, and especially to devices of this class in which a tire consists of separate elastic blocks each having an individual base, and the means for connecting said blocks and bases with the rim, and the object of the invention is to provide a construction of the kind specified which will be strong and durable and efficient in operation, and which may be quickly and easily repaired when necessary, and with this and other objects in view the invention consists in the construction combination and arrangement of parts hereinafter described and claimed.

The invention is fully disclosed in the following specification, of which the accompanying drawing forms a part, in which the separate parts of our improvement are designated by suitable reference characters.

In the drawing forming part of this specification, we have shown at A the felly of a wheel which may be of any preferred construction and made of any suitable material, and said felly is provided with spokes B, which connect the same with the hub C. Resting on the felly A are base plates D, and attached or made fast to the outer surface of these sectional base plates are the elastic treads E.

The ends of the base plates D, are bent outwardly on an angle.

Engaging the base plates D, are clamping or tightening plates F, each having a square counter-sunk opening in its center. These clamping or tightening plates are held in position by means of the bolts G, which pass through the felly A and are drawn and held tight by means of the nuts H.

When it is desired to attach one section or all the sections of our tire to a wheel the base plate or plates D, with the elastic treads E, are positioned on the felly A, the clamping or tightening plates F, are positioned so that their bent slanted ends engage the slanted ends of the base plates D, the bolts G, with square counter-sunk heads are inserted into the openings in the clamping or tightening plates F, and pass through the felly A and the nuts H, are screwed on, and as the bolts G, are drawn into and through the felly A the clamping or tightening plates F, cause the base plates D, to be drawn together thereby holding them on and in proper position on the felly A of the wheel. This construction and arrangement of parts permits the removal of a single section as is sometimes desirable in making repairs or the changing of a single tread when worn.

The treads being separated by intervening spaces permit of individual action in yielding lengthwise and sidewise thereby reducing the vibration of the wheel when in use.

Having described our invention what we claim and desire protected by Letters Patent is:

A tire for a vehicle wheel comprising a plurality of separate base plates engaging the periphery of the felly of the wheel and arranged in spaced relation, each of said plates having out-turned ends, bolts passing radially through the felly of the wheel and interposed between adjacent base plates, clamping plates carried by said bolts having inturned ends adapted to engage the out-turned ends of adjacent base plates, whereby the tightening of said bolts clamps said plates firmly in position and an elastic tread member secured to the outer surface of each of said plates with the ends thereof in spaced relation to the ends of the plate.

In testimony whereof we have hereunto set our hands in the presence of two subscribing witnesses.

FREDERICK H. BOMMARIUS.
PHILIP CAROLLO.

Witnesses:
GEORGE BORDESSA,
FREDERICK P. ENGEL.